(12) United States Patent
Rakic et al.

(10) Patent No.: US 8,015,430 B1
(45) Date of Patent: *Sep. 6, 2011

(54) USING ASSET DEPENDENCIES TO IDENTIFY THE RECOVERY SET AND OPTIONALLY AUTOMATE AND/OR OPTIMIZE THE RECOVERY

(75) Inventors: Branka Rakic, Maple Grove, MN (US); Steven Kappel, Savage, MN (US); Guido Westenberg, Minneapolis, MN (US); Shelley A. Schmokel, Prior Lake, MN (US); Peter A. Barber, Woking (GB); Richard L. Harrison, Georgetown, TX (US)

(73) Assignee: Symantec Operating Corporation, Mountain View, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 12/113,734

(22) Filed: May 1, 2008

Related U.S. Application Data

(63) Continuation of application No. 10/881,218, filed on Jun. 30, 2004, now Pat. No. 7,386,752.

(51) Int. Cl.
*G06F 11/00* (2006.01)
(52) U.S. Cl. .................. 714/2; 714/4.3; 714/20
(58) Field of Classification Search ............... 714/2, 4.3, 714/20
See application file for complete search history.

(56) References Cited

U.S. PATENT DOCUMENTS

| | | | | |
|---|---|---|---|---|
| 4,665,520 | A * | 5/1987 | Strom et al. ................... 714/15 |
| 5,355,371 | A * | 10/1994 | Auerbach et al. .............. 370/255 |
| 5,712,971 | A | 1/1998 | Stanfill et al. |
| 5,832,202 | A | 11/1998 | Slavenburg et al. |
| 5,923,832 | A * | 7/1999 | Shirakihara et al. ............ 714/37 |
| 6,105,148 | A | 8/2000 | Chung et al. |
| 6,163,855 | A * | 12/2000 | Shrivastava et al. ............. 714/4 |
| 6,170,009 | B1 | 1/2001 | Mandal et al. |
| 6,332,200 | B1 | 12/2001 | Meth et al. |
| 6,401,216 | B1 | 6/2002 | Meth et al. |
| 6,526,022 | B1 | 2/2003 | Chiu et al. |
| 6,647,510 | B1 | 11/2003 | Ganesh et al. |
| 7,076,692 | B2 | 7/2006 | Grey |
| 7,266,722 | B2 * | 9/2007 | Kingsbury ..................... 714/15 |

(Continued)

OTHER PUBLICATIONS

IGG-03172004-01, C. Claunch, "Management Update: Best Practices in Business Continuity and Disaster Recovery," Artivle Mar. 17, 2004, Gartner, Inc., 13 pages.

Strategic Planning, SPA-21-3174, R. Paquet, C. DiCenzo, "Predicts 2004: Recovery Replaces Backup and Replication," Resaeach Note, Nov. 18, 2003, Gartner, Inc., 3 pages.

(Continued)

*Primary Examiner* — Scott T Baderman
*Assistant Examiner* — Loan Truong
(74) *Attorney, Agent, or Firm* — Lawrence J. Merkel; Meyertons, Hood, Kivlin, Kowert & Goetzel, P.C.

(57) ABSTRACT

In one embodiment, a computer accessible medium stores a plurality of instructions including instructions which, when executed: track dependencies among a plurality of assets; and responsive to an identification of an asset for potential recovery (the "selected asset"), identify an asset dependency set corresponding to the selected asset. The asset dependency set comprises at least a subset of the plurality of assets, wherein each asset in the subset has a dependency with the selected asset. In some embodiments, one or more of the following may be provided: tracking asset dependencies and presenting the asset dependency set to the user; pruning the asset dependency set to a recovery set identifying the asset dependency set; generating the recovery order (optionally optimized); initiating the recovery according to the recovery order; performing recovery steps; generating the recovery plan and/or executing recovery plans.

29 Claims, 8 Drawing Sheets

U.S. PATENT DOCUMENTS

| | | | |
|---|---|---|---|
| 7,386,752 B1 * | 6/2008 | Rakic et al. | 714/2 |
| 7,467,330 B2 * | 12/2008 | Kingsbury et al. | 714/19 |
| 7,873,941 B2 * | 1/2011 | Buskens et al. | 717/106 |
| 2002/0023129 A1 * | 2/2002 | Hsiao et al. | 709/205 |
| 2002/0035706 A1 | 3/2002 | Connor et al. | |
| 2002/0049912 A1 | 4/2002 | Honjo et al. | |
| 2003/0159086 A1 * | 8/2003 | Arndt | 714/25 |
| 2003/0225800 A1 | 12/2003 | Kavuri | |
| 2003/0225801 A1 | 12/2003 | Devarakonda et al. | |
| 2004/0078334 A1 | 4/2004 | Malcolm et al. | |
| 2004/0105390 A1 | 6/2004 | Saksio | |
| 2005/0066239 A1 | 3/2005 | Keeton et al. | |
| 2005/0102547 A1 | 5/2005 | Keeton et al. | |

OTHER PUBLICATIONS

Dynamic Markets "Utility Computer: The CIO Squeeze?", Independent Market Research Repot commissioned by VERITAS, Sep. 2003, 151 pages.

"Topological Sorting," Directed Graphs, "Algorithms in C++" by Robert Sedgewick, Addison-Wesley 1992, ISBN 0-201-51059-6 pp. 479-480.

Kimberly Keeton, et al., "Automatic Design of Dependable Data Storage Systems," Jun. 2003, 6 pages.

Kimberly Keeton, et al., "Automating Data Dependability," ACM-SIGOPS European Workshop, Saint-Emilion, France, Sep. 2002, 8 pages.

* cited by examiner

USING ASSET DEPENDENCIES TO IDENTIFY THE RECOVERY SET AND OPTIONALLY AUTOMATE AND/OR OPTIMIZE THE RECOVERY

This application is a continuation of U.S. patent application Ser. No. 10/881,218, filed on Jun. 30, 2004 now U.S. Pat. No. 7,386,752, which is incorporated herein by reference in its entirety.

BACKGROUND OF THE INVENTION

1. Field of the Invention

This invention is related to the field of protection and recovery of computer system data.

2. Description of the Related Art

Data protection for computer systems is an important part of ensuring that the information generated on a computer system and/or stored on the computer system is not lost due to the occurrence of a hardware failure, a software failure, user error, or other environmental event (e.g. power outage, natural disaster, intentionally-caused disaster, accidental disaster, etc.). Generally, events that the data protection scheme is designed to protect against are referred to herein as disaster events. The data protection scheme attempts to make redundant copies of the data and locate those copies such that the data is safe from the disaster events and such that the data can be restored to the computer system or to another computer system rapidly enough to be acceptable given the nature of the data, its importance to the creator of the data, etc.

While restoration of the data after a disaster event is part of recovery, restoration alone may not be enough to ensure recovery. Generally, recovery refers to actually bringing back into operation the applications and other software/functionality that were in operation on a computer system or systems prior to the disaster event. Generally, the application software, the underlying operating system software, and data/configuration files for the application and operating system must be restored to a logically consistent state to permit recovery. The number of components that need to be restored in consistent state may be large, and dependencies of components on each other may not be clear at the time of recovery. Which components need to be restored prior to others may also not be clear. For example, if an operating system driver is to be recovered, then the applications running on that operating system may need to be restarted. However, if the driver was corrupted due to a hardware failure, the hardware may need to be replaced and a more complex recovery involving restoring, reconfiguring, and restarting the applications on the new hardware may be needed.

Recovery is frequently performed under significant time pressure. The pressure, and the complexity of properly recovering, may frequently lead to mistakes on the part of the individuals responsible for performing the recovery (e.g. information technology (IT) professionals, also referred to as administrators). The recovery time may be lengthened significantly. Particularly, which components require recovery and in which order the components are to be recovered may be a source of error. In many cases, it is only the experience of the administrators in similar previous recoveries that indicates the recovery process for a current recovery. A less experienced administrator may be less likely to rapidly perform a correct recovery.

SUMMARY OF THE INVENTION

In one embodiment, a computer accessible medium storing a plurality of instructions is contemplated. The plurality of instructions include instructions which, when executed, track dependencies among a plurality of assets. Responsive to an identification of an asset for potential recovery (the "selected asset"), the instructions, when executed, identify an asset dependency set corresponding to the selected asset. The asset dependency set comprises at least a subset of the plurality of assets, wherein each asset in the subset has a dependency with the selected asset. In some embodiments, various levels of automation and decision support for the recovery process are provided. For example, some embodiments may track asset dependencies and present the asset dependency set to the user, thus identifying assets that may need recovery. Other embodiments may prune the asset dependency set to a recovery set identifying the assets to be recovered. The pruning may be performed, e.g., using user input and/or other methods. Other embodiments may generate the recovery order (optionally optimized) for the user to follow, and still other embodiments may initiate the recovery according to the recovery order. To the extent that steps in the recovery may be automated, some embodiments may perform the recovery steps. Other embodiments may generate the recovery plan for each asset for the user to follow, and still other embodiments may execute the recovery plans to the extent that the recovery plans may be automated. A computer system and method are also contemplated.

BRIEF DESCRIPTION OF THE DRAWINGS

The following detailed description makes reference to the accompanying drawings, which are now briefly described.

Figure 1:
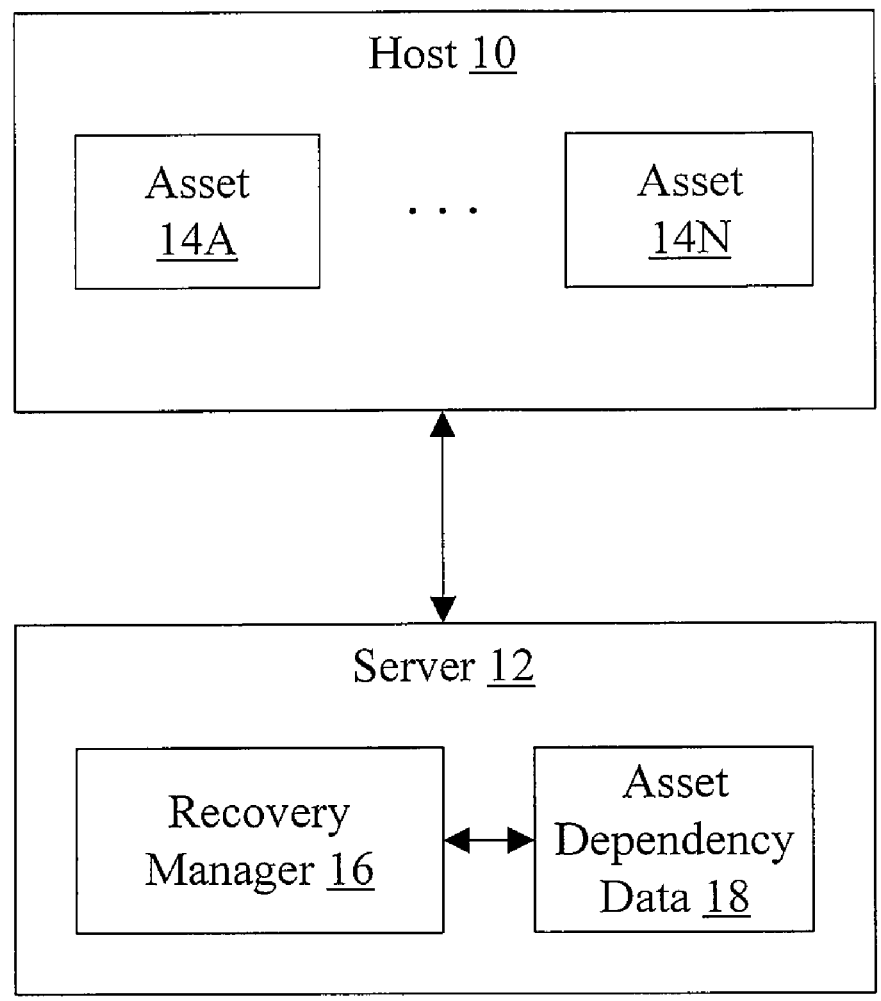
FIG. 1 is a block diagram of one embodiment of a host and a server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a host 10 and a server 12. The host 10 is coupled to the server 12. The host 10 includes one or more assets (e.g. assets 14A-14N in FIG. 1). In the illustrated embodiment, the server 12 includes a recovery manager 16 and asset dependency data 18.

Generally, the assets 14A-14N are each an entity of computer system data and/or functionality on the host 10 and that is to be protected such that it can be recovered after a disaster event. In the context of an asset, computer system data is being used in its generic sense to refer to both data and instruction code, in general, although a given asset may comprise only data or only instruction code. In some cases, a given asset 14A-14N may be a "physical" asset (e.g. a file, the data on a volume or on a physical disk, the data comprising a server, etc.). In other cases, a given asset may be a "logical" asset which groups together two or more assets. The assets comprising a logical asset are referred to as component assets. Component assets may be physical assets, or may themselves be logical assets in some embodiments. For example, an application environment may be a logical asset and may comprise one or more of the application itself, various configuration files for the application, various data files created by and/or used by the application, the volume(s) and/or file system(s) used by the application, the in-memory state of the application if the application is executing, one or more web servers that interface with the application, etc. As a more specific example, the logical asset may be an SAP AG application and the component assets may include the application, one or more underlying databases, one or more web servers, configuration and data files, and in-memory state. In some cases, an asset may span multiple computer systems. That is, portions of the asset may reside on different computer systems.

The assets 14A-14N may have various dependencies. Generally, a first asset has a dependency on a second asset if the first asset requires that the second asset be in place for correct operation of the first asset. Dependencies may be direct or indirect. A direct dependency of a first asset on a second asset is a dependency of the first asset immediately on the second asset. For example, if the dependencies are represented by a directed acyclic graph of the assets as described below, the vertex corresponding to the first asset has an edge to the vertex corresponding to the second asset. An indirect dependency of a first asset on a second asset is a dependency that occurs due to a direct dependency of the first asset on a third asset that has a dependency (direct or indirect) on the second asset. Viewed in another way, if a first asset is indirectly dependent on a second asset, there is at least one asset between the first asset and the second asset on the directed acyclic graph. Additionally, if an asset is a logical asset, there may be internal dependencies between its component assets.

The recovery manager 16 comprises software that is provided to assist in the recovery of assets after a disaster event occurs. Particularly, the recovery manager 16 may track asset dependencies to aid in identifying a set of assets to be recovered (the "recovery set") if a given asset is identified as a suspect in the disaster event. The asset identified as the suspect is referred to herein as the "selected asset". The recovery set may, in some cases, include the selected asset, and may include one or more additional assets as well. In other cases, the selected asset may not be included in the recovery set. For example, it may be the case that the selected asset may not require recovery, but rather assets on which the selected asset depends may be recovered. For each additional asset in the recovery set, either the additional asset is dependent on the selected asset or the selected asset has a dependency on the additional asset. Thus, generally, the additional assets may have dependencies with the selected asset.

Figure 2:
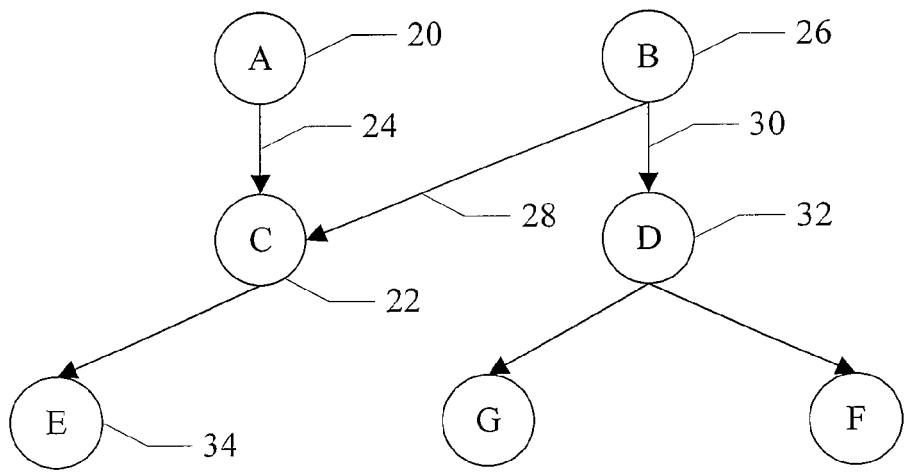
FIG. 2 is a diagram illustrating one embodiment of a directed acyclic graph.

In one embodiment, given the selected asset, the recovery manager 16 may use the asset dependency data 18 to provide an asset dependency set corresponding to the selected asset. The asset dependency data 18 may be created when assets are defined, and may be maintained dynamically as assets are added, deleted, redefined, grouped in logical assets, removed from logical assets, etc. The asset dependency data 18 may use any data structure to track dependencies between assets. In one embodiment, for example, the asset dependency data 18 may represent the dependencies as a directed acyclic graph. An example of a directed acyclic graph is shown in FIG. 2 and described in more detail below. The directed acyclic graph (also referred to as a dependency graph herein) is used as an example of the asset dependency data 18, but any representation of the dependencies may be used in the embodiments described below.

The asset dependency set includes the selected asset and each asset having a dependency with the selected asset. Thus, the asset dependency set may represent a complete set of assets for potential recovery, based on the identification of the selected asset. Including assets on which the selected asset depends may ensure that no asset is forgotten when recovery is performed, which may permit a successful recovery on the first attempt in some embodiments (e.g. assuming the asset dependency data 18 is complete). Including assets that depend on the selected asset may also result in such assets participating in the recovery. In some cases, recovering such assets may be simply restarting the asset (e.g. in the case of an application) so as to begin using the recovered underlying assets instead of the assets prior to the recovery. In other cases, such assets may be recovered to a state consistent with the underlying assets. The term recover may refer to restoring computer system data and ensuring logical consistency of the computer system data. If the computer system data being recovered includes software, recovering may further include ensuring that the software is up and running.

The asset dependency set may be used to form the recovery set. In some cases, the recovery set may be the entire asset dependency set. In other cases, the asset dependency set may be pruned of one or more assets to generate the recovery set (i.e. the recovery set may be a subset of the asset dependency set, excluding the pruned assets). As mentioned above, in some cases, the pruned assets may include the selected asset. That is, the selected asset may be excluded from the recovery set.

In some embodiments, the recovery manager 16 may determine a recovery order for the recovery set. The recovery order may be generated such that each asset is recovered prior to any asset that depends on that asset. In some embodiments, the recovery manager 16 may also attempt to optimize the recovery order by parallelizing independent recovery paths. In some embodiments, the recovery manager 16 may also generate a recovery plan for each asset in the recovery set, identifying the recovery method or methods to be used, the asset copies to be used, etc.

In various embodiments, the recovery manager 16 may support different levels of automation and decision support for the recovery process. For example, some embodiments may track asset dependencies and present the asset dependency set to the user, thus identifying assets that may need recovery. Such embodiments may help the user (e.g. an administrator or other person tasked with performing the recovery) avoid forgetting to recover an asset. Other embodiments may prune the asset dependency set to the recovery set (using user input and/or other methods). Other embodiments may generate the recovery order (optionally optimized) for the user to follow, and still other embodiments may initiate the recovery according to the recovery order. To the extent that steps in the recovery may be automated, some embodiments of the recovery manager 16 may perform the recovery steps. For example, asset copies that reside on local disk in the host 10 may be automatically recovered, whereas asset copies on tape may, in some cases, require user intervention to mount the tape. Other embodiments may generate the recovery plan for each asset for the user to follow, and still other embodiments may execute the recovery plans to the extent that the recovery plans may be automated. In still other embodiments, the recovery manager 16 may support automated detection of which assets are to be recovered. In yet other embodiments, the recovery manager 16 may initiate and perform recovery in the correct order, where the correct order is determined dynamically as the recovery proceeds. That is, determining and optimizing the recovery order may be combined with performing the actual recovery.

The host 10 comprises one or more computer systems that store and/or manipulate the assets 14A-14N. In some cases, external storage such as network attached storage (NAS) or storage area network (SAN) storage may store some of the assets 14A-14N, and the host 10 may comprise the NAS/SAN storage as well.

In the illustrated embodiment, the server 12 executes the recovery manager 16. Generally, the server 12 comprises software that may be executed on a computer system. In some embodiments, the server 12 may be executed on a separate computer system from those in the host 10. In such embodiments, the computer system executing the server 12 may be configured to communicate with the computer system(s) in the host 10 (e.g. via a network). In other embodiments, the server 12 may be executed on a computer system in the host 10. Additionally, some embodiments may include no servers (that is, the recovery manager 16 may be executed on the host 10). In still other embodiments, the recovery manager 16 may be executed on another computer system that has no server relationship to the host 10 (e.g. on an administrator's computer system).

In various embodiments, user input may be accepted (e.g. to identify the selected asset, prune assets from the asset dependency set, etc.). User input may be provided to the recovery manager 16 in any desired fashion. Generally, the computer system that is executing the recover manager 16 may have one or more user input devices such as a keyboard, a mouse or other pointing device, voice input, touch screen, etc. The user may provide user input via the user input devices.

FIG. 2 is a block diagram of one embodiment of a directed acyclic graph. Each vertex of the graph corresponds to an asset, and an edge from a first vertex to a second vertex represents a dependency of the first asset (corresponding to the first vertex) on the second asset (corresponding to the second vertex). Edges are represented by arrows, with the head of the arrow at the vertex representing the asset on which the dependency exists and the tail of the arrow at the vertex representing the asset having the dependency.

For example, a vertex 20 shown in FIG. 2 (corresponding to asset "A") has an edge 24 to a vertex 22 (corresponding to asset "C"), thus representing a dependency of asset A on asset C. Similarly, a vertex 26 (corresponding to asset "B") has an edge 28 to vertex 22 and an edge 30 to vertex 32 (corresponding to asset "D"), thus representing dependencies of asset B on both asset C and asset D. There are various paths through the graph (represented by vertices and the edges between them). For example, vertices 20, 22, and 34 and the edges therebetween represent a path, as do the vertices 26, 22, and 34. A graph is acyclic if no path exists that starts and ends on the same vertex.

There may also be a hierarchical nature to the dependency graphs. If an asset in a dependency graph is a logical asset, there may be another dependency graph corresponding to that logical asset, representing the dependencies of the component assets.

Figure 3:
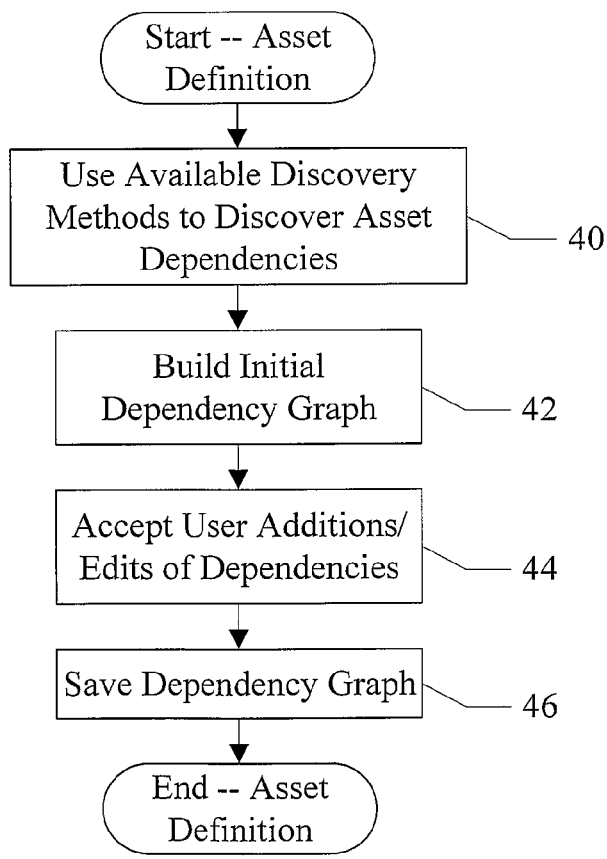
FIG. 3 is a flowchart illustrating operation of one embodiment of a recovery manager during asset definition.

FIG. 3 is a flowchart illustrating operation of one embodiment of the recovery manager 16 during asset definition. That is, the recovery manager 16 may comprise instructions which, when executed, perform the operation illustrated in FIG. 3.

The recovery manager 16 may use available discovery methods to discover assets and their dependencies (block 40). A variety of discovery methods exist. For example, discovery methods may include the hardware access layer (HAL) available from VERITAS Software Corporation™ (Mountain View, Calif.), common information model/web-based enterprise management (CIM/WBEM) based discovery, operating-system implemented discovery mechanisms (e.g. Microsoft Windows™ network neighborhood), application discovery mechanisms in various software monitoring products (e.g. the Precise I$^3$™ product available from VERITAS Software Corporation), discovery mechanisms in various data protection products, intelligent application agents provided for various applications, etc. In some embodiments, the recovery manager 16 may implement an open application programming interface (API) to which discovery methods may be written, and the recovery manager 16 may support any discovery methods that use the open API.

The recovery manager 16 may build an initial directed acyclic dependency graph (or graphs) to represent the discovered dependencies (block 42). The dependency graph may be presented to the user (e.g. graphically), and the user may choose to modify the dependency graph (block 44). User modifications may include deleting assets, adding assets, or modifying the dependencies between the assets, for example. The generated dependency graph or graphs may be saved as the asset dependency data 18 (block 46).

It is noted that the asset dependency data 18 may comprise one or more dependency graphs. Some dependency graphs may represent independent groups of assets. Other dependency graphs may represent dependencies between component assets of a logical asset that is included in one or more other dependency graphs. In other embodiments, automatic discovery of assets and dependencies may not be implemented and user input may be the source of asset dependency data 18.

A similar process to that of FIG. 3 may be performed at various other points in time to update the asset dependency data 18. As mentioned above, the assets on the host 10 may change over time as assets are added and deleted. In some cases, asset dependency data may be dynamically discovered at the time of asset protection. In some cases, the asset dependency data 18 may retain historical records of the asset dependencies. For example, the dependency data 18 may be a superset of the assets and dependencies that have existed on the host 10 over time. To recover to a previous point in time at which the assets or dependencies differ from the current assets, the previous point may be specified and the asset dependency set/recovery set may be based on the assets/dependencies existing at the previous point. In other embodiments, the asset dependency data may be determined and/or verified at the time of recovery.

Figure 4:
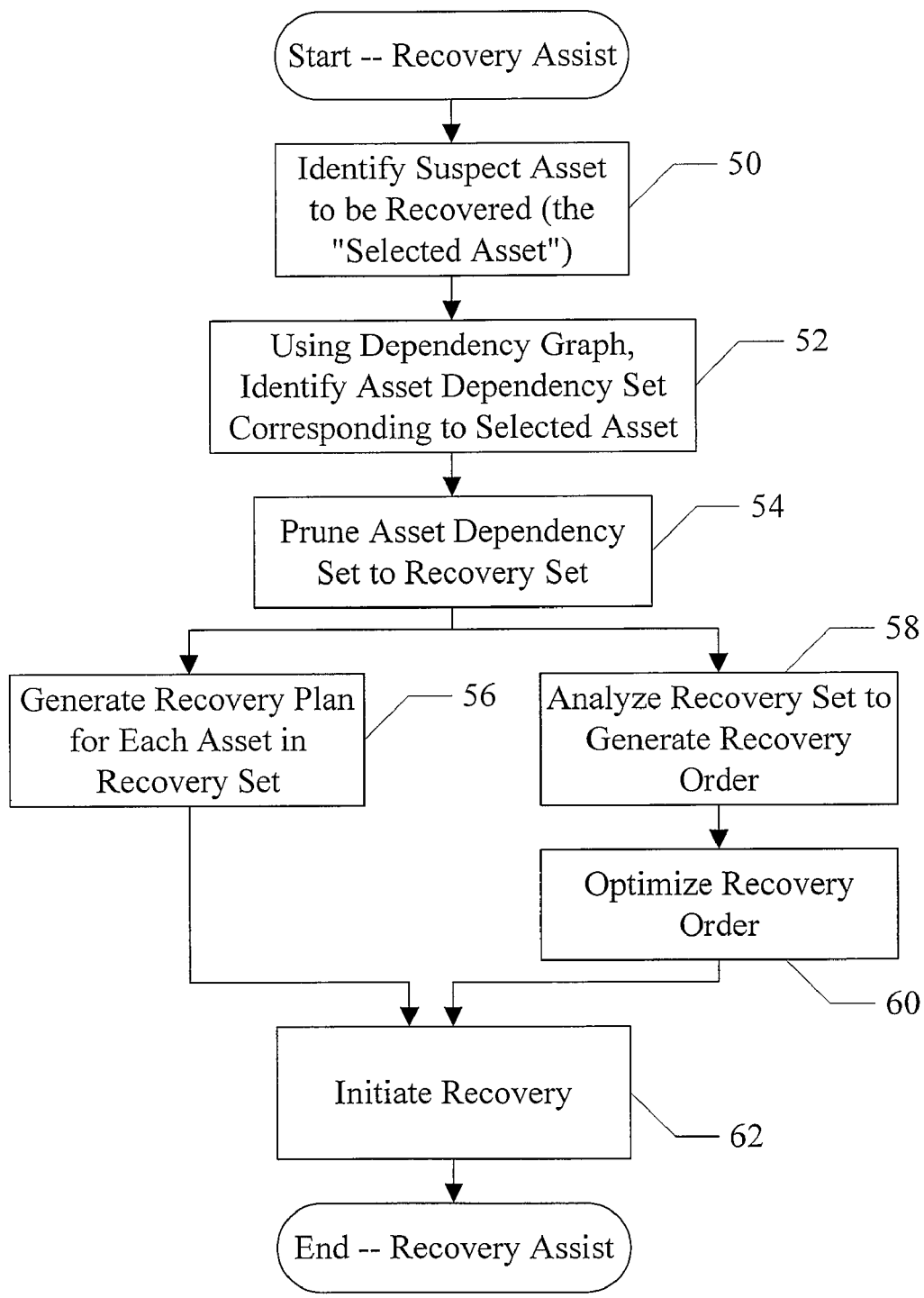
FIG. 4 is a flowchart illustrating operation of one embodiment of a recovery manager to assist in asset recovery.

Turning next to FIG. 4, a flowchart is shown illustrating operation of one embodiment of the recovery manager 16 to assist recovery. That is, the recovery manager 16 may comprise instructions which, when executed, perform the operation illustrated in FIG. 4. Other embodiments may implement subsets of the functionality shown in FIG. 4, as discussed above with regard to FIG. 1.

The selected asset may be identified (block 50). In some embodiments, the recovery manager 16 may receive an indication of the selected asset. For example, the selected asset may be identified via user input to the recovery manager 16. The user may observe the host 10 and may determine that the selected asset is in need of recovery, or at least that the selected asset is, or appears to be, not functioning properly. In some cases, the selected asset may appear to be not functioning properly and the corrective action may be to recover an asset or assets on which the selected asset depends. The selected asset may then be restarted, in some cases, to complete the recovery. Alternatively, the selected asset may be identified through discovery methods (such as the discovery methods described above) or diagnostic methods run on the assets. In some cases, the selected asset may be identified by an "intelligent agent" (software included with the asset or a set of assets that is designed to interact with the assets). In yet another alternative, the selected asset may be identified by monitoring software (e.g. performance monitoring software such as the Precise I$^3$™ product available from VERITAS Software Corporation) that detects a performance problem or functional problem with an asset.

Using the dependency graph or graphs containing the selected asset, the recovery manager 16 may identify the asset dependency set corresponding to the selected asset (block 52). As mentioned previously, the asset dependency set includes both assets that are dependent on the selected asset and assets on which the selected asset depends.

The recovery manager 16 may prune the asset dependency set to generate the recovery set (block 54). In some cases, the asset dependency set and the recovery set may be coextensive, but in other cases the recovery set may be smaller than the asset dependency set (that is, the recovery set may exclude one or more assets included in the asset dependency set). Assets may be pruned, e.g., via user input. Assets may also be pruned if diagnostic software, intelligent agents, or other monitoring software verifies that the pruned asset is not in need of recovery (particularly for assets on which the selected asset depends). In some cases, the user may also add assets to the recovery set in the pruning (e.g. if the asset dependency data 18 is incomplete). Thus, in some cases, the recovery set may be larger than the asset dependency set.

Once the recovery set has been determined, recovery plans for each asset in the recovery set are generated (block 56) and the recovery order is determined (block 58) and optionally optimized (block 60). Generating the recovery plans and determining the recovery order are logically independent operations, and thus are shown in parallel in FIG. 4. The operations may be performed in parallel, or in either order in series, in various embodiments. In still other embodiments, the operations may be combined and performed dynamically as the recovery manager 16 traverses the recovery set. For example, the user may instruct the recovery manager 16 to recover to the most recent state and the recovery manager 16 may dynamically determine the order of recovery, generate a recovery plan for each asset, and recover each asset as the recovery manager traverses the recovery set.

A recovery plan describes the recovery method(s) and asset copy(ies) that are to be used to recovery the corresponding asset. In some cases, the recovery plan may include multiple steps to recover. For example, backup methods often include periodically making a full backup and making incremental/differential backups between the full backups. Recovering an asset from backup may include restoring the most recent full backup image followed by restoring each incremental image that has been made since the most recent full backup. In other cases, different recovery methods may be combined to provide the recovery plan (e.g. a bare metal restore type of recovery, followed by restore of one or more conventional backups made since the most recent bare metal restore-type backup). Still further, a recovery plan for a logical asset may include one or more recovery steps for each component asset. Additional details regarding recovery plan generation for one embodiment are provided below with regard to FIG. 6.

Generating the recovery order from the recovery set (block 58) when the recovery set is represented as a directed acyclic graph may employ any algorithms associated with such graphs. A reverse topological sort of the graph yields a recovery order that ensures that each asset is recovered prior to any asset that depends on that asset. For example, a recursive depth-first traversal algorithm applied to the recovery set yields a reverse topological sort of the graph. The recovery order thus defined may be executed serially (that is, one asset at time in the order listed in the sort results) to perform the recovery. Alternatively, the order may be optimized by performing independent recovery paths in parallel (block 60). Additional details regarding optimization for one embodiment are provided in more detail below with regard to FIG. 5. It is noted that, while generating the recovery order and optimizing the recovery order are shown as separate blocks in FIG. 4, other embodiments may combine the blocks. That is, the generation and optimization of the recovery order may be combined. Furthermore, generation and optimization of the recovery order may be combined with the actual recovery of assets so the generation, optimization, and actual recovery are performed as the recovery manager 16 traverses the recovery set.

With recovery plans for each asset in the recovery set and with the recovery order defined, recovery may be initiated (block 62). The recovery may be performed manually by a user, following the recovery plans and the defined order. Alternatively, in some cases, some or all of the recovery may be automated. For example, the recovery manager 16 may perform most of the recovery, prompting the user for asset copies as needed. In some cases, the recovery may be completely automated and user intervention may not be required.

In some embodiments, the recovery manager 16 may also estimate the time to complete the recovery using the recovery order and estimates for each recovery plan. If a single serial order is used, the estimates may simply be added. If parallelization is used, the estimated time for each parallel path may be computed and the longer of the times may be used for that portion of the recovery. As recovery progresses, the measured recovery time for each asset may be used to update the estimate and/or the estimated time remaining.

Figure 5:
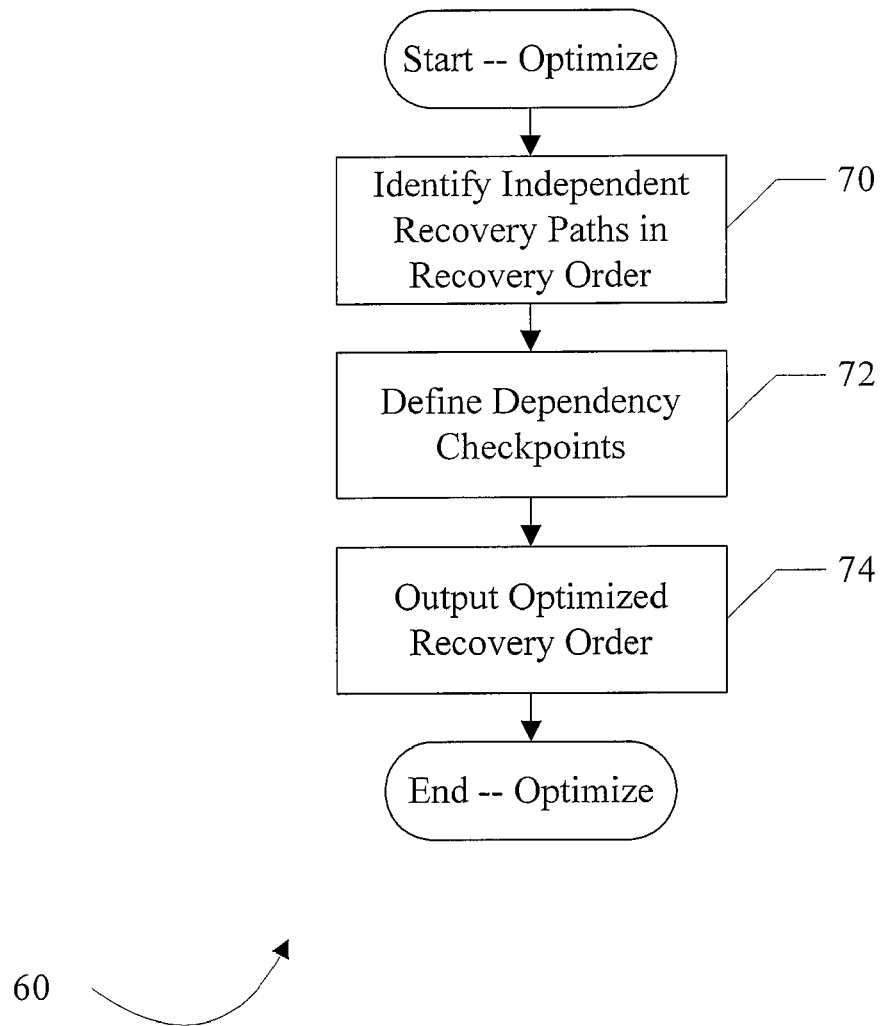
FIG. 5 is a flowchart illustrating one embodiment of an optimize recovery order block shown in FIG. 4.

FIG. 5 is a flowchart illustrating operation of one embodiment of the recovery manager 16 to optimize the recovery order (block 60 in FIG. 4). That is, the recovery manager 16 may comprise instructions which, when executed, perform the operation illustrated in FIG. 5.

The recovery manager 16 identifies independent recovery paths in the recovery order (block 70). The term recovery path refers, in this case, to paths on the directed acyclic graph that represents the recovery set. Each recovery path includes at least one vertex (one asset) and may include multiple vertices (assets) to be recovered in series according to their dependencies with each other. Each vertex in an independent recovery path may depend on at most one other vertex: its predecessor in the path. Two recovery paths are independent if each of the vertices in one path have no dependencies on the vertices in the other path, and vice versa. A variety of network optimization algorithms may be used to identify the independent paths. Independent recovery paths may be pursued in parallel, speeding the recovery time.

It is possible that, to ensure correct recovery, a given recovery path (or recovery of a specific asset) may need to be delayed until one or more conditions are met. A dependency checkpoint may be defined, and processing of the given recovery path or recovery of the specific asset may be delayed until the one or more conditions specified for that dependency checkpoint are satisfied. In some cases, more than one path may be delayed until a given dependency checkpoint has been satisfied. The recovery manager 16 may identify conditions that are to be satisfied before processing of a recovery path or recovery of the specific asset may commence, and may define the dependency checkpoints (block 72). Additionally, the recovery manager 16 may associate each dependency checkpoint with the recovery path(s)/asset recovery(ies) that are to be delayed. Any conditions may be specified for a given dependency checkpoint. For example, a condition may be completion of recovery of the assets in another path. As another example, a condition may be completion of recovery of a specific asset. As one example of such a dependency, two or more paths may converge at a vertex (asset) that has dependencies on vertices (assets) in each recovery path. The recovery manager 16 may identify such vertices, and define dependency checkpoints for such vertices. As another example, two or more independent paths may diverge from the same vertex, and a dependency checkpoint may be generated for completion of recovery of the asset corresponding to that vertex.

As mentioned above, in some cases, the generation of the recovery order, the optimization of the recovery order, and/or the initiation of recovery may be combined. In some cases, there may be no explicit identification of independent recovery paths.

The recovery manager 16 may output the optimized recovery order (block 74). The format of the recovery order may depend on how the recovery order is used. For example, if a user is to manually perform the recovery, the recovery order may be in a human-readable form. If the recovery manager 16 is to perform the recovery (or guide the user in the recovery), the recovery order may be encoded in a compact, machine readable form for processing by the recovery manager 16 during the recovery process.

In various embodiments, any type of optimization may be performed. Some embodiments may use network optimization algorithms. In some cases, network optimization algorithms may be extensions of graph algorithms used with directed acyclic graphs, such as the depth-first search algorithm. The extensions may, in some cases, be in the form of additional processing performed at each node in the graph as the node is traversed in the graph, avoiding separate traversals for different parts of an overall operation (e.g. determining the order, optimizing the order, and executing the recovery).

There may be numerous variations of network optimization algorithms, any of which may be employed. Several examples are set forth below, but these examples are not intended to be exhaustive. To the contrary, the examples are merely illustrative.

In a first example, the order determination, optimization, and recovery execution may be combined. In the first example, directed acyclic graph representing the recovery set may be traversed using, e.g., depth-first search. Each asset that is only a sink on the graph (i.e. it does not depend on any other assets, but other assets may depend on it) may be assigned to an independent processing thread (where a processing thread may execute recovery operations). Each subsequent asset that depends on a single predecessor is assigned to the same thread as its predecessor. If there is more than one dependent asset, each dependent asset may be assigned to a new parallel thread, but the new threads may not start until completion of the thread that includes the predecessor. That is, a dependency checkpoint may be defined for the new threads, awaiting completion of the thread that includes the predecessor. Each asset that depends on more than one predecessor may similarly be assigned to a new thread whose start is dependent on completion of the threads that include each of the predecessors. That is, a dependency checkpoint may be defined for the new thread, awaiting the completion of each of the threads that include the predecessors. Thus, when the directed acyclic graph traversal is complete, each thread is either executing, available to execute, or waiting for their dependency checkpoint to be satisfied.

In a second example, the optimized recovery order may be generated to be executed later (either manually or automatically). This example may be similar to the above example, except that instead of assigning each asset recovery task to a thread, the asset's information may be written to a path. For each path that is to start after a dependency checkpoint is satisfied, the dependency checkpoint may be written to the path prior to any asset's information being written to the path. The path "writing" may use a variety of formats, depending on whether a human or a machine will be using it to execute recovery. The end result is a set of paths that may be executed in parallel, some dependent on dependency checkpoints. Alternatively, the set of paths may be presented to the user for manual performance.

A third example may be a variation of the first example. In the third example, the recovery set may be traversed using a reverse topological sort algorithm such as the depth-first search. Recovery of each asset that is only a sink on the graph may be initiated in parallel. Non-sink assets may be skipped. The algorithm may then wait for notification of recovery completion for an asset. In response to any asset recovery completion, that asset and dependencies of other assets upon that asset are deleted from the graph. The graph traversals, initiation of recovery for sink assets, waiting for notification, and deleting completed assets from the graph may be repeated until each asset in the recovery set has been recovered. This example progressively prunes the recovery set in sync with the recovery task completion. Optimized recovery execution may be performed, even though independent recovery paths are not explicitly identified by the algorithm.

A fourth example may be a variation of the second example. In this example, the serial order of the assets may first be generated, then the parallel execution order (paths). The algorithm in the fourth example may include first generating the reverse topological sort of the recovery set and saving the sort, along with the dependency information. To determine the optimized parallel execution order, the algorithm may traverse the previously generated serial order and create parallel paths, along with the dependency checkpoints, if any, for each path.

Figure 6:
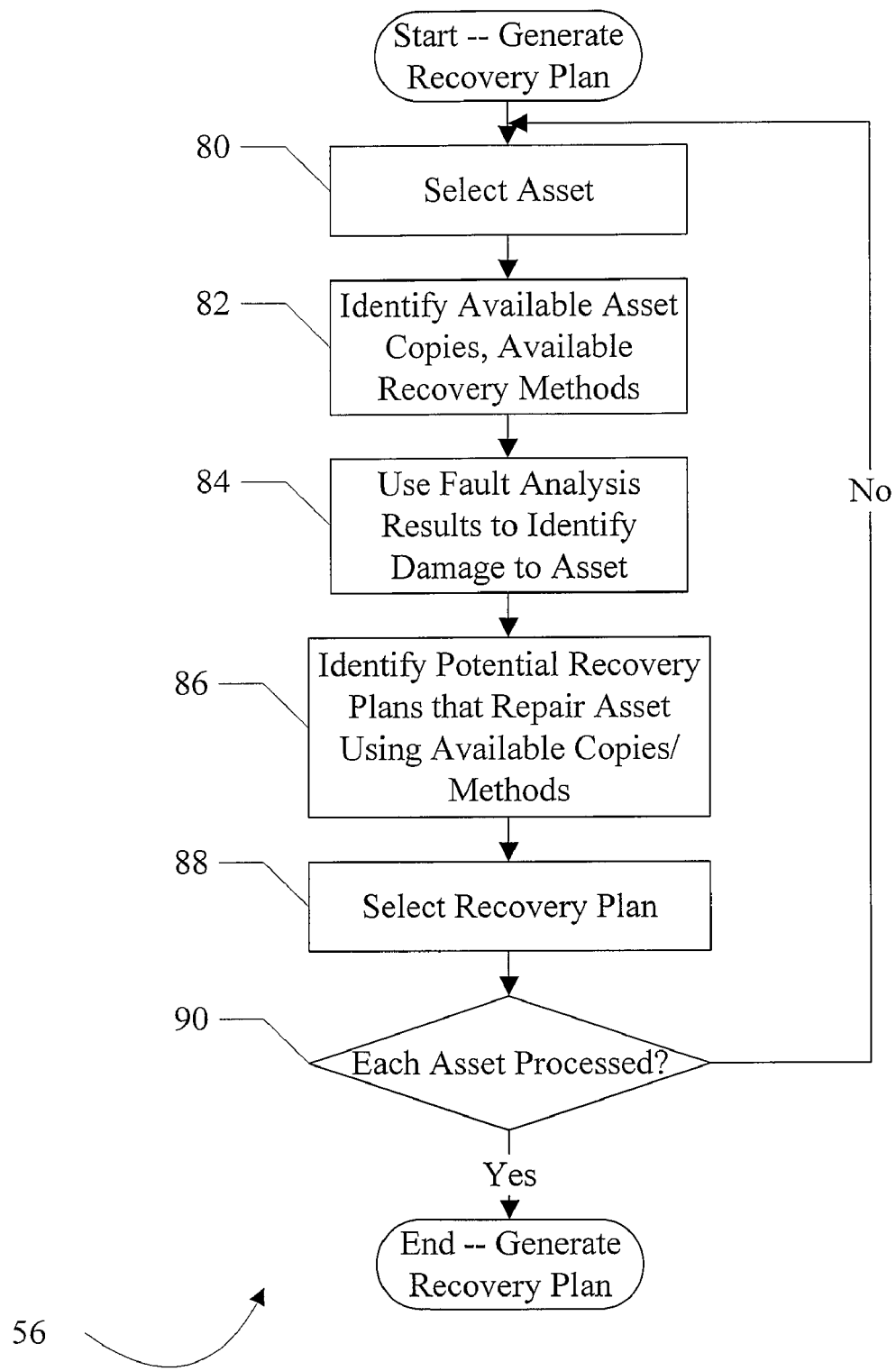
FIG. 6 is a flowchart illustrating one embodiment of a generate recovery plan block shown in FIG. 4.

FIG. 6 is a flowchart illustrating operation of one embodiment of the recovery manager 16 to generate a recovery plan for the recovery set assets (block 56 in FIG. 4). That is, the recovery manager 16 may comprise instructions which, when executed, perform the operation illustrated in FIG. 6.

The recovery manager 16 may select an asset from the recovery set for which to generate a recovery plan (block 80). In other embodiments, the user may select the entire recovery set and request a recovery plan, such as to recover the most recent state. In such an embodiment, the recovery manager 16 may automatically analyze the asset copies available for each asset and generate the recovery plan for each asset. The recovery manager 16 may identify the available recovery methods and available asset copies for recovery of the asset (block 82). The available recovery methods may be determined by discovery, for example. The asset copies may correspond to a recovery method, and may be cataloged or otherwise identified by the recovery method. The recovery methods may include any mechanism for recovery. For example, an asset that is dependent on the selected asset may merely need to be restarted (e.g. if the asset is or includes software). Thus, restarting the asset may be a recovery method.

Additionally, various recovery methods generally correspond to the data protection methods used to generate the asset copies. Such recovery methods may include, for example, bare metal restore-type recovery, conventional backup recovery, recovery from a snapshot, recovery from a replica, failover on a cluster, and reprovisioning. Conventional backup recovery involves restoring a backup image (or a set of backup images in a specified order, if incremental/differential backup is used). Conventional backup recovery presumes that the computer system to which the restore is performed is functioning (e.g. an operating system is installed and working). On the other hand, bare metal restore-type recovery involves starting with bare hardware (no software yet installed) and restore the assets onto the bare hardware. The assets include the operating system and other low level system management software in such a case, and may also include one or more applications. Snapshots are generally a synchronized copy of the state of a computer system (or systems) at a particular point in time, and may include the state of any processes executing at the time and the in-memory state of the computer system(s) in addition to the data stored in non-volatile storage. If more than one computer system is included in a snapshot, the snapshot may be a logical snapshot assembled from snapshots of each computer system. Replication involves replicating data objects to another computer system over time. Data objects may be defined differently in different implementations. For example, a data object may be one of the following, in various implementations: a file, a directory structure of files, a volume, a disk block, etc. Recovering from snapshots and replicas may be similar to conventional backup recovery, except that the snapshot image or replica image is used. Reprovisioning refers to installing a pregenerated "golden image" of the asset. The golden image may not include the latest state of the asset at the time of the disaster event, but in some cases, the most recent state may not be required. Some assets may be essentially stateless, or the state may not be required to be recovered for functionality to be returned. For example, a web server may not be required to recover to its most recent state. The OpForce™ product from VERITAS Software Corporation may be an example of software that performs provisioning/reprovisioning. Fail over to another server in the cluster may be used as a recovery method if the asset is on a cluster.

The determination of the available methods/copies may also be impacted by the choice of the point in time to which the recovery is desired. In many cases, recovery to the most recent possible point in time is desired. However, in some cases, a previous point may be desired. For example, if the disaster event includes infection by a virus or other software having a nefarious intent, the user may wish to recover to a point prior to introduction of the virus into the system. Additionally, if recovery is being performed for historical purposes (e.g. data from the past is needed for regulatory/legal reasons), the point in the past that is desired may be specified. In such cases, the copies that exist from the desired time frame (or somewhat before or after the time frame) may determine what recovery methods are available.

Fault analysis from the disaster event, various monitoring or diagnostic tools, and/or user input may also be used to identify the damage, if any, to the asset (block 84). For example, if the asset is a logical asset and only certain component assets are damaged, the damaged component assets may be recovered without recovering other component assets (according to the dependencies within the asset, using a pruning process similar to that described above). Similarly, if the fault analysis indicates that the asset is intact but dependent on an asset that is being recovered, the most appropriate recovery method may be to restart the asset. Fault analysis may further include determining what the asset is, which may affect the desired recovery. If the asset is a single file, recovering from backup may be desirable. If the asset is not an asset that is backed up (e.g. a web server), provisioning a web server from the golden image may be desirable. It is noted that the fault analysis (block 84) may be performed in parallel with identifying available recovery methods/asset copies (block 82).

Based on the available asset copies and methods, the recovery manager 16 may identify potential recovery plans that repair the damage and that use the available recovery methods/asset copies (block 86). The recovery manager 16 may then select the recovery plan (block 88). Alternatively, the user may be presented with the possible recovery plans and may select the desired recovery plan. If the recovery manager 16 selects the recovery plan, the selection may be guided by one or more criteria (which may be user selected). For example, minimizing the recovery time may be one criteria. Minimizing data loss may be another criteria. Minimizing recovery effort (e.g. by the user) may be a criteria. More than one criteria may be specified, in some embodiments, and may be weighted in some implementations. The recovery manager 16 may score the potential recovery plans based on the criteria and present the scores to the user or select the recovery plan having the best score.

The recovery manager 16 may determine if all assets have been processed to generate recovery plans (decision block 90). If not (decision block 90, "no" leg), the recovery manager 16 may repeat blocks 80, 82, 84, 86, and 88 for the next asset. If all assets have been processed (decision block 90, "yes" leg), the recovery manager 16 has completed generating the recovery plans.

Figure 7:
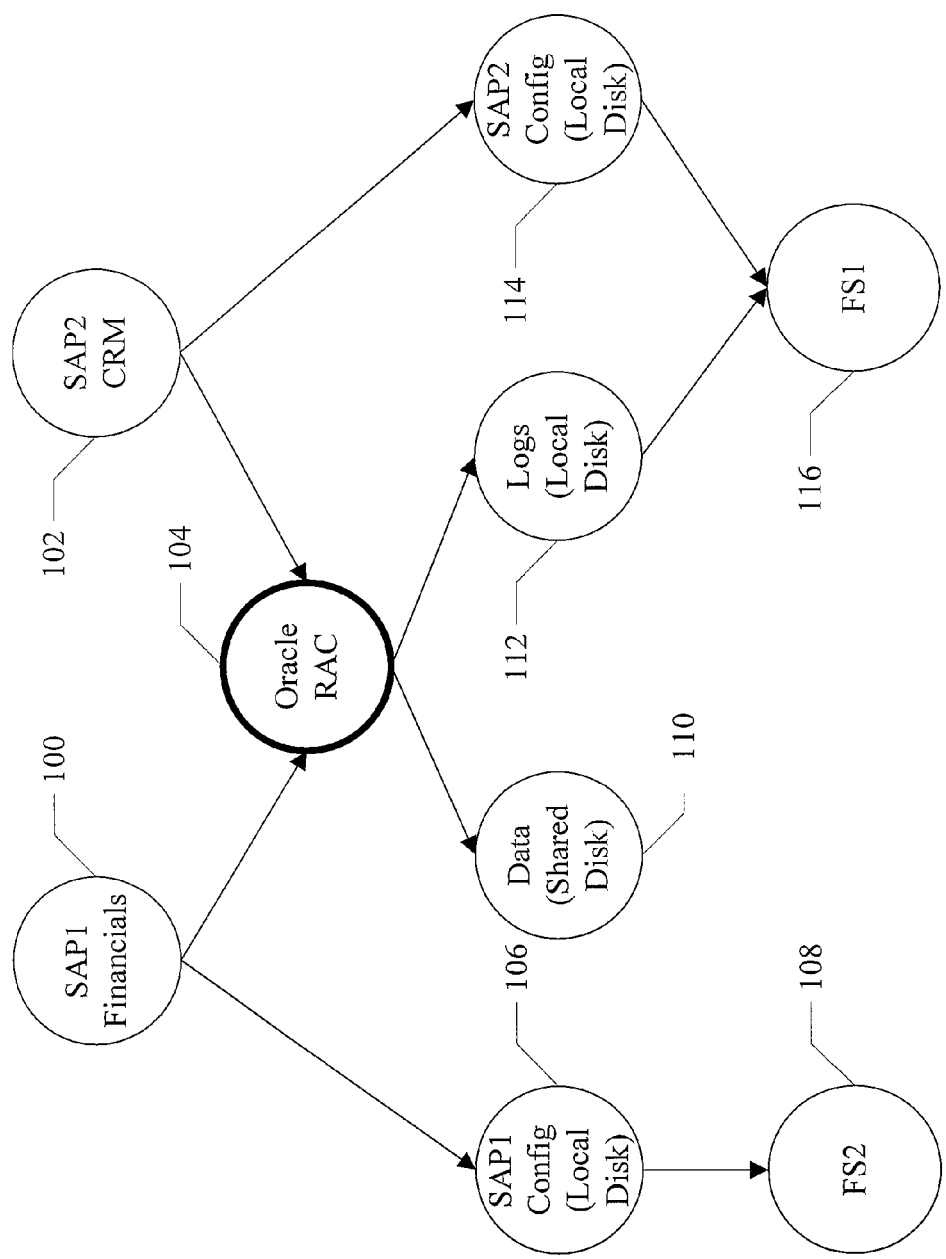
FIG. 7 is a diagram of an example of an asset dependency set for a selected asset.
Figure 9:
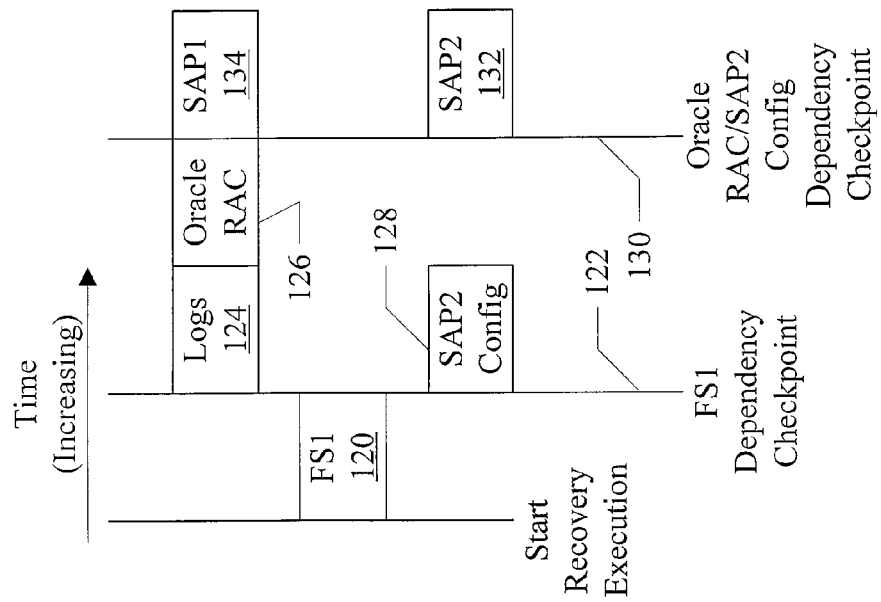
FIG. 9 is a timing diagram illustrating an example of recovery of assets in the recovery set.
Figure 8:
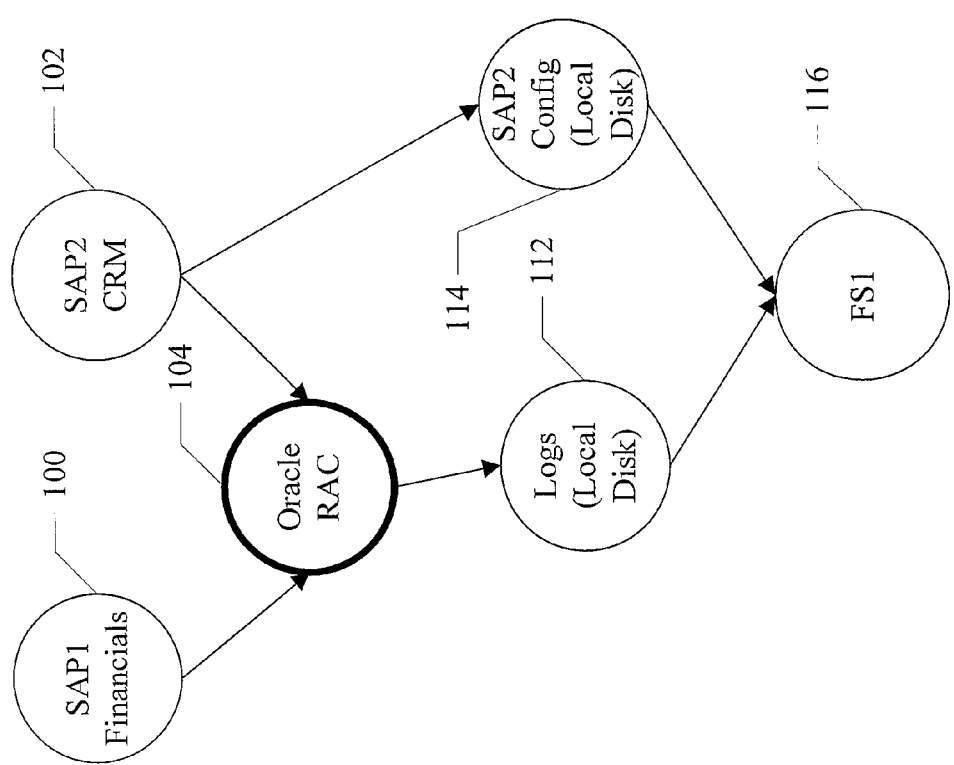
FIG. 8 is a diagram of an example of a recovery set for a selected asset.

FIGS. 7-9 illustrate an example of an asset dependency set and a corresponding recovery using a pair of SAP applications (applications for the SAP product from SAP AG) and related software/data as assets. Particularly, in FIG. 7, the assets may include a first SAP application (SAP1) used for financial information (reference numeral 100), a second SAP application (SAP2) used for customer relationship management (CRM) (reference numeral 102), an Oracle database on a Real Application Cluster (RAC) (reference numeral 104), a configuration file for the SAP 1 application (reference numeral 106), a filesystem (FS2) on which the SAP1 configuration file is stored (reference numeral 108), the data for the Oracle database, stored on a shared disk (reference numeral 110), the logs for the Oracle database, stored on a local disk (reference numeral 112), a configuration file for the SAP2 application (reference numeral 114), and a filesystem (FS1) on which the SAP2 configuration file and the logs are stored (reference numeral 116).

The SAP1 and SAP2 applications use data from the Oracle database, and thus are dependent on the Oracle RAC. Additionally, each SAP application is dependent on its respective configuration file. The SAP1 configuration file is dependent on the filesystem in which it is stored (FS2). The Oracle RAC is dependent on its data and its logs. The SAP2 configuration file and the logs are dependent on the filesystem in which they are stored (FS1). In the example of FIG. 7, the Oracle RAC is identified as the selected asset (heavy line) for a recovery. The assets in FIG. 7 form the asset dependency set for the Oracle RAC.

In FIG. 8, the asset dependency set has been pruned to the SAP1 and SAP2 applications (which are to be restarted since they depend on the Oracle RAC), the Oracle RAC, the logs, the SAP2 configuration file, and the filesystem FS1 (reference numerals 100, 102, 104, 112, 114, and 116). The assets pruned from the asset dependency may be deleted for various reasons. For example, one or more of the pruned assets may have been pruned because the user, diagnostics, or other mechanisms verify that the pruned assets are not damaged and the state of the pruned assets is logically consistent with the state of the other assets that are to be recovered. In other cases, the pruned asset may be implicitly recovered by recovering one or more other assets. In some embodiments, for example, the data for the Oracle database stored on the shared disk (reference numeral 110) may be implicitly recovery by recovering the Oracle RAC (reference numeral 104). Analyzing the recovery set, the filesystem FS1 is to be recovered first. Then, two independent recovery paths are formed (the logs and the Oracle RAC are one independent recovery path, and the SAP2 configuration file is the other independent recovery path. In the present example, a dependency checkpoint is generated for the two independent recover paths on the completion of recovering the filesystem FS1. A dependency checkpoint is also generated for recovering the SAP2 application (for dependencies on the recovery of the Oracle RAC and the SAP2 configuration file). The SAP1 application may be recovered after the Oracle RAC, and may not be impacted by the dependency checkpoint. It is noted that the generation of dependency checkpoints may depend on the optimization algorithm used, and thus may differ in other examples that use other algorithms.

FIG. 9 is a timing diagram illustrating an example of the recovery of the recovery set in the example of FIG. 8. Time increases from left to right. At the start of recovery execution, the filesystem FS1 is recovered (reference numeral 120). Both independent recovery paths are dependent on the filesystem FS1, and thus the recovery of the paths is not started until the filesystem FS1 is recovered. That is, a dependency checkpoint is defined and recovery of the paths is not started until the dependency checkpoint is satisfied (line 122). The recovery of the logs (reference numeral 124), and the Oracle RAC serially thereafter (reference numeral 126), are one independent recovery path and the recovery of the SAP2 configuration file is the other independent recovery path (reference numeral 128). The dependency checkpoint for the Oracle RAC and the SAP2 configuration file (line 130) is shown, delaying the SAP2 application recovery (reference numeral 132). The SAP1 application recovery is also shown (reference numeral 134). While the SAP1 application recovery 134 is shown proceeding after the dependency checkpoint 130 in FIG. 9, SAP1 application recovery 134 is not governed by the dependency checkpoint 130 since it is only dependent on the Oracle RAC recovery 126. For example, if the SAP2 configuration file recovery 128 had taken longer than the logs recovery 124 and the Oracle RAC recovery 126, the SAP1 recovery 134 may have started serially after the Oracle RAC recovery 126, even though the dependency checkpoint 130 had not yet been satisfied.

Figure 10:
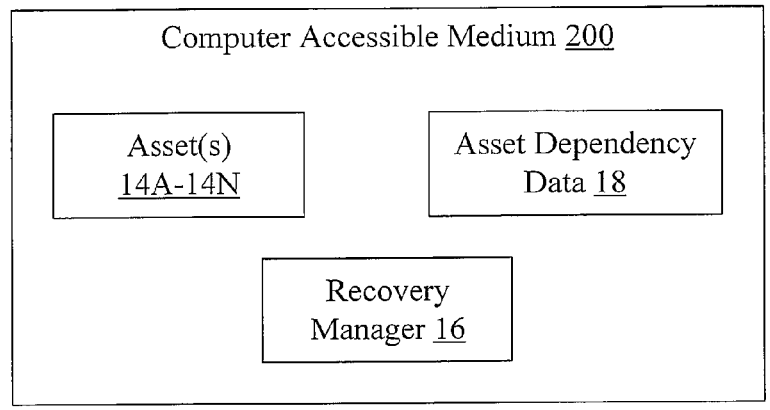
FIG. 10 is a block diagram of one embodiment of a computer accessible medium.

Turning now to FIG. 10, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 10 may be encoded with one or more of the assets 14A-14N, the asset dependency data 18, and/or the recovery manager 16. The recovery manager 16 may each comprise instructions which, when executed, implement the operation described herein for the recover manager 16. Generally, the computer accessible medium 200 may store any set of instructions which, when executed, implement a portion or all of the flowcharts shown in one or more of FIGS. 3, 4, 5, and 6.

Figure 11:
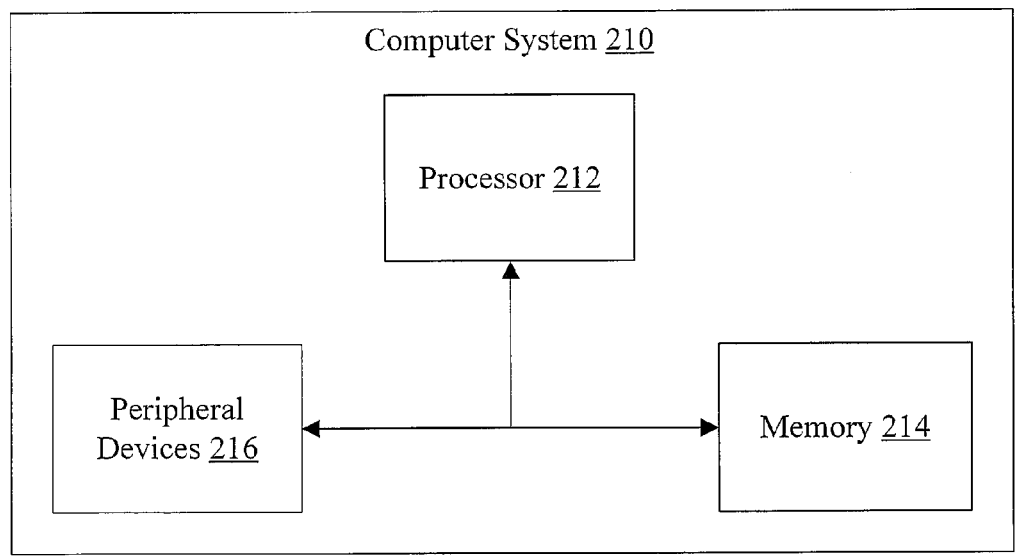
FIG. 11 is a block diagram of one embodiment of a computer system.

FIG. 11 is a block diagram of one embodiment of an exemplary computer system 210. In the embodiment of FIG. 11, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:

identifying dependencies among a plurality of assets on a computer system, wherein a dependent asset of the plurality of assets has a dependency on another asset of the plurality of assets if the dependent asset requires that the other asset is in place for correct operation of the dependent asset;

recording the dependencies among the plurality of assets in an asset dependency data structure, wherein the recording comprises dynamically updating the dependencies during operation; and responsive to an identification of a selected asset for potential recovery, identifying an asset dependency set corresponding to the selected asset using the asset dependency data structure, the asset dependency set comprising at least a subset of the plurality of assets, wherein each asset in the subset has a dependency with the selected asset, wherein the dependency between each asset and the selected asset is recorded in the asset dependency data structure, and wherein the subset comprises a second asset that depends on the selected asset; and recovering assets in the subset, wherein the recovering comprises:

recovering one or more assets on which the selected asset depends;

recovering the selected asset subsequent to recovering the one or more assets responsive to the dependency of the selected asset on the one or more assets; and recovering the second asset subsequent to recovering the selected asset responsive to the dependency of the second asset on the selected asset.

2. The method as recited in claim 1 wherein the subset comprises a third asset on which the selected asset depends.

3. The method as recited in claim 1 wherein the dependency with the selected asset comprises a direct dependency for a third asset of the subset.

4. The method as recited in claim 3 wherein the dependency with the selected asset comprises an indirect dependency for a fourth asset of the subset.

5. The method as recited in claim 1 further comprising forming a recovery set from the asset dependency set, the recovery set comprising at least a subset of the assets in the asset dependency set.

6. The method as recited in claim 5 wherein forming the recovery set comprises pruning the asset dependency set, wherein the recovery set excludes at least one asset included in the asset dependency set.

7. The method as recited in claim 5 further comprising determining a recovery order for the recovery set, the recovery order ensuring that each given asset in the recovery set is recovered prior to other assets in the recovery set that depend on the given asset.

8. The method as recited in claim 7 wherein determining the recovery order comprises identifying independent recovery paths in the recovery order and parallelizing recovery of the independent recovery paths, each independent recovery path comprising serialized recovery of one or more assets.

9. The method as recited in claim 8 further comprising identifying a dependency checkpoint in the recovery order for at least one asset that depends on two or more assets, each of the two or more assets in different independent recovery paths.

10. The method as recited in claim 7 wherein determining the recovery order for the recovery set further comprises optimizing the recovery order.

11. The method as recited in claim 10 wherein optimizing the recovery order comprises parallelizing recovery of at least some assets.

12. The method as recited in claim 11 wherein optimizing the recovery order further comprises identifying one or more dependency checkpoints, wherein recovery of assets listed in the recovery order subsequent to a first dependency checkpoint of the one or more dependency checkpoints is delayed until one or more conditions specified by the first dependency checkpoint are met.

13. The method as recited in claim 5 further comprising generating a recovery plan for each asset in the recovery set responsive to fault analysis of the asset and available asset recovery methods and copies for the asset.

14. The method as recited in claim 1 wherein the asset dependency data structure is a directed acyclic dependency graph representing the dependencies among the plurality of assets.

15. A computer accessible storage medium storing a plurality of instructions comprising instructions which, when executed:

identify dependencies among a plurality of assets on a computer system, wherein a dependent asset of the plurality of assets has a dependency on another asset of the plurality of assets if the dependent asset requires that the other asset is in place for correct operation of the dependent asset;

record the dependencies among the plurality of assets in an asset dependency data structure, wherein the recording comprises dynamically updating the dependencies during operation; and responsive to an identification of a selected asset for potential recovery, identify an asset dependency set corresponding to the selected asset using the asset dependency data structure, the asset dependency set comprising at least a subset of the plurality of assets, wherein each asset in the subset has a dependency with the selected asset, wherein the dependency between each asset and the selected asset is recorded in the asset dependency data structure, and wherein the subset comprises a second asset that depends on the selected asset; and recover assets in the subset, including:

recovering one or more assets on which the selected asset depends;

recovering the selected asset subsequent to recovering the one or more assets responsive to the dependency of the selected asset on the one or more assets; and recovering the second asset subsequent to recovering the selected asset responsive to the dependency of the second asset on the selected asset.

16. The computer accessible storage medium as recited in claim 15 wherein the subset comprises a third asset on which the selected asset depends.

17. The computer accessible storage medium as recited in claim 15 wherein the dependency with the selected asset comprises a direct dependency for a third asset of the subset.

18. The computer accessible storage medium as recited in claim 17 wherein the dependency with the selected asset comprises an indirect dependency for a fourth asset of the subset.

19. The computer accessible storage medium as recited in claim 15 wherein the plurality of instructions further comprise instructions which, when executed, form a recovery set from the asset dependency set, the recovery set comprising at least a subset of the assets in the asset dependency set.

20. The computer accessible storage medium as recited in claim 19 wherein forming the recovery set comprises pruning the asset dependency set, wherein the recovery set excludes at least one asset included in the asset dependency set.

21. The computer accessible storage medium as recited in claim 19 wherein the plurality of instructions further comprise instructions which, when executed, determine a recovery order for the recovery set, the recovery order ensuring that each given asset in the recovery set is recovered prior to other assets in the recovery set that depend on the given asset.

22. The computer accessible storage medium as recited in claim 21 wherein determining the recovery order for the recovery set further comprises optimizing the recovery order.

23. The computer accessible storage medium as recited in claim 22 wherein optimizing the recovery order comprises parallelizing recovery of at least some assets.

24. The computer accessible storage medium as recited in claim 23 wherein optimizing the recovery order further comprises identifying one or more dependency checkpoints, wherein recovery of assets listed in the recovery order subsequent to a first dependency checkpoint of the one or more dependency checkpoints is delayed until one or more conditions specified by the first dependency checkpoint are met.

25. The computer accessible storage medium as recited in claim 19 wherein the plurality of instructions further comprise instructions which, when executed, generate a recovery plan for each asset in the recovery set responsive to fault analysis of the asset and available asset recovery methods and copies for the asset.

26. The computer accessible storage medium as recited in claim 15 wherein the asset dependency data structure is a directed acyclic dependency graph representing the dependencies among the plurality of assets.

27. A computer accessible storage medium storing a plurality of instructions comprising instructions which, when executed:
   identify dependencies among a plurality of assets on a computer system, wherein a dependent asset of the plurality of assets has a dependency on another asset of the plurality of assets if the dependent asset requires that the other asset is in place for correct operation of the dependent asset;
   record the dependencies among the plurality of assets in an asset dependency data structure, wherein the recording comprises dynamically updating the dependencies during operation;
   responsive to an identification of a selected asset for potential recovery, identify an asset dependency set corresponding to the selected asset using the asset dependency data structure, the asset dependency set comprising at least a subset of the plurality of assets, wherein each asset in the subset has a dependency with the selected asset;
   form a recovery set from the asset dependency set, the recovery set comprising at least a subset of the assets in the asset dependency set;
   determine a recovery order for the recovery set, the recovery order ensuring that each given asset in the recovery set is recovered prior to other assets in the recovery set that depend on the given asset, wherein determining the recovery order includes identifying independent recovery paths in the recovery order and parallelizing recovery of the independent recovery paths, each independent recovery path comprising serialized recovery of one or more assets.

28. The computer accessible storage medium as recited in claim 27 wherein the plurality of instructions further comprise instructions which, when executed, identify a dependency checkpoint in the second recovery order for at least one asset that depends on two or more assets, each of the two or more assets in different independent recovery paths.

29. The computer accessible storage medium as recited in claim 27 wherein forming the recovery set comprises pruning the asset dependency set, wherein the recovery set excludes at least one asset included in the asset dependency set.

* * * * *